(12) United States Patent
Nakamrura

(10) Patent No.: US 7,102,080 B2
(45) Date of Patent: Sep. 5, 2006

(54) GROMMET, WATER-STOP STRUCTURE OF WIRE HARNESS AND METHOD OF PRODUCING WIRE HARNESS

(75) Inventor: Yoshio Nakamrura, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/729,377

(22) Filed: Dec. 8, 2003

(65) Prior Publication Data

US 2004/0222007 A1 Nov. 11, 2004

(30) Foreign Application Priority Data

Dec. 9, 2002 (JP) ............... P. 2002-357273
Dec. 9, 2002 (JP) ............... P. 2002-357274

(51) Int. Cl.
*H02G 3/18* (2006.01)

(52) U.S. Cl. ............... 174/65 G; 174/153 G; 174/152 G; 16/2.1; 16/2.2; 248/56

(58) Field of Classification Search ............ 174/65 G, 174/135, 72 A, 152 R, 152 G, 142, 153 G; 248/56; 16/2.1, 2.2; 439/604, 271
See application file for complete search history.

(56) References Cited

U.S. PATENT DOCUMENTS

| | | | | |
|---|---|---|---|---|
| 2,424,758 A * | 7/1947 | Klumpp, Jr. | ............ | 174/153 G |
| 2,920,129 A * | 1/1960 | Rapata | ............ | 174/153 G |
| 2,930,840 A * | 3/1960 | Klumpp, Jr. | ............ | 174/153 R |
| 3,141,062 A * | 7/1964 | Rapata | ............ | 174/153 G |
| 3,506,999 A * | 4/1970 | Neher | ............ | 174/152 G |
| 3,836,269 A * | 9/1974 | Koscik | ............ | 16/2.2 |
| 4,002,822 A * | 1/1977 | Kurosaki | ............ | 174/153 G |
| 5,545,854 A * | 8/1996 | Ishida | ............ | 174/153 G |
| 5,635,678 A * | 6/1997 | Yasukuni | ............ | 174/152 G |
| 5,639,993 A * | 6/1997 | Ideno et al. | ............ | 248/56 |
| 6,010,134 A * | 1/2000 | Katoh | ............ | 174/152 G |
| 6,218,625 B1 * | 4/2001 | Pulaski | ............ | 248/56 |
| 6,627,817 B1 * | 9/2003 | Kortenbach | ............ | 174/65 G |

FOREIGN PATENT DOCUMENTS

| | | |
|---|---|---|
| JP | 3-112984 U | 11/1991 |
| JP | 3-126315 U | 12/1991 |
| JP | 4-72424 U | 6/1992 |
| JP | 4-85525 U | 7/1992 |
| JP | 8-031251 A | 2/1996 |
| JP | 8-251769 A | 9/1996 |
| JP | 2001-052551 A | 2/2001 |
| JP | 2001-069645 A | 3/2001 |
| JP | 2001-231132 A | 8/2001 |

\* cited by examiner

*Primary Examiner*—Angel R. Estrada
(74) *Attorney, Agent, or Firm*—Sughrue Mion, PLLC

(57) ABSTRACT

A grommet for holding a wire harness includes a plurality of wires on which an adhesive tape is wound. The wire harness has a water-stop portion. A water-stop agent is filled in interstices between the plurality of wires at the water-stop portion. The grommet includes a first division member and a second division member. The first division member has a convex portion formed on an outer face thereof. The second division member has a concave portion for receiving the water-stop portion. The concave portion has a shape corresponding to a cross-sectional shape of the wire harness. An inner face of the first division member is pressed against the water-stop portion of the wire harness when the convex portion of the first division member is pressed toward the second division member.

3 Claims, 6 Drawing Sheets

GROMMET, WATER-STOP STRUCTURE OF WIRE HARNESS AND METHOD OF PRODUCING WIRE HARNESS

BACKGROUND OF THE INVENTION

This invention relates to a grommet, a water-stop structure of a wire harness and a method of producing a wire harness.

There is already known a relief apparatus for transmitting a relief signal from a submerged vehicle. As shown in FIGS. 5A, 5B and 6, such a relief apparatus includes a detection device 1 for detecting the intrusion of water into the interior of the vehicle, a transmitting device 2 for transmitting a relief signal in response to the detection signal from the detection device 1, and a wire harness 3 connecting the detection device 1 and the transmitting device 2 together.

The transmitting device 2 is contained within a waterproof box 5 provided, for example, below a seat 4 of the vehicle. The waterproof box 5 includes a box body 5a having a notch portion 6, and a lid 5b, and the wire harness 3 is extended into the interior of the waterproof box 5 through the notch portion 6, and is connected to the transmitting device 2.

As shown in FIG. 7, a water-stop agent 3b is filled in a predetermined portion of a bundle of (many) wires 3a forming the wire harness 3, and thereafter an adhesive tape 3c is wound on the bundle of wires 3a to cover the same, and that portion of the wire bundle in which the water-stop agent 3b is filled serves as a water-stop portion. A grommet 7, mounted on this water-stop portion, is located at the notch portion 6.

JP-A-8-251769 discloses the grommet 7 including a division member body 7a and a seal portion 7b which are separated from each other along a plane parallel to an axis of a tubular grip portion 8 for holding the water-stop portion in a radial direction, and the division member body 7a and the seal portion 7b are releasably combined together.

The water-stop portion of the wire harness 3 is gripped by the grip portion 8 of the grommet 7 in the radial direction, and in this condition the seal portion 7b of the grommet 7 is fitted into the notch portion 6 formed in the box body 5a of the waterproof box 5, and the lid 5b is locked to the box body 5a. Thus, the grommet 7 is located at the notch portion 6 of the waterproof box 5.

Incidentally, when the grommet 7 is located at the notch portion 6 of the waterproof box 5, a seal between the grommet 7 and the notch portion 6, a seal between the grommet 7 and the wire harness 3, and a seal at the water-stop portion are formed. Here, a water-stop performance of the water-stop portion is obtained by positively filling the water-stop agent 3b in the interstices between the wires 3a, and therefore the water-stop portion is, for example, kneaded with the hands of the operator after the adhesive tape 3c is wound therearound, and this operation for kneading the water-stop portion is cumbersome, which invites a problem that the efficiency of the operation is low.

SUMMARY OF THE INVENTION

This invention has been made in view of the above problem, and an object of the invention is to provide a grommet, a water-stop structure of a wire harness and a wire harness-producing method, in which a positive water-stop performance of a water-stop portion of the wire harness is easily obtained.

The above object has been achieved by a grommet of the invention for holding a wire harness including a plurality of wires on which an adhesive tape is wound, the wire harness has a water-stop portion, and a water-stop agent is filled in interstices between the plurality of wires at the water-stop portion, the grommet comprising:

a first division member, having a convex portion formed on an outer face thereof; and a second division member, having a concave portion for receiving the water-stop portion, the concave portion having a shape corresponding to a cross-sectional shape of the wire harness, wherein an inner face of the first division member is pressed against the water-stop portion of the wire harness when the convex portion of the first division member is pressed toward the second division member.

In the grommet of this construction, the convex portion is formed on the outer face of the first division member facing away from the second division member in a separating direction, and therefore when the first division member is pressed toward the second division member by a lid of a waterproof box, a pressing force, acting on the convex portion, is larger than a pressing force acting on the other portions, and as a result the water-stop portion of the wire harness, disposed within the grip portion, that is, disposed in registry with the convex portion, is effectively pressed. Therefore, the first division member will not be deformed outwardly by the water-stop portion of the wire harness pressed against this first division member, and therefore the water-stop portion is deformed within the grip portion of the grommet, so that the water-stop agent is positively filled in the interstices between the wires, and a positive water-stop performance of the water-stop portion is easily obtained.

Therefore, this grommet solves the problem encountered with the conventional construction in which in order to obtain the positive water-stop performance of the water-stop portion of the wire harness, the water-stop portion is kneaded with the hands of the operator after the adhesive tape is wound therearound, and this operation for kneading the water-stop portion is cumbersome, so that the efficiency of the operation is low.

Preferably, the inner face of the first division member of the grommet has a flat face.

In the grommet of this construction, the water-stop portion of the wire harness can be positively generally flattened within the grip portion of the grommet.

According, to another aspect of the invention, there is provided a water-stop structure of a wire harness, comprising:

a wire harness, including a plurality of wires on which an adhesive tape is wound, the wire harness having a water-stop portion, and a water-stop agent being filled in interstices between the plurality of wires at the water-stop portion;

a grommet, including a first division member and a second division member for holding the water-stop portion of the wire harness; and a waterproof box, including a box body for receiving a part of the wire harness, and a lid member for closing the box body, wherein the first division member has a convex portion formed on an outer face thereof;

wherein the first division member is formed in a substantially plate-shape so as to extend along an edge of an opening of the box body; and wherein the second division member has a concave portion for receiving the water-stop portion, and the concave portion has a shape corresponding to a cross-sectional shape of the wire harness; and wherein the second division member is mounted at a notch portion of the box body; and wherein the convex portion of the first division member is pressed toward the second division member by the lid so that an inner face of the first division member is pressed against the water-stop portion of the wire harness when the grommet for holding the wire harness is assembled to the waterproof box.

In the wire harness water-stop structure of this construction, the convex portion is formed on the outer face of the first division member facing away from the second division member in a separating direction, and therefore when the first division member is pressed toward the second division member by the lid of the waterproof box, a pressing force, acting on the convex portion, is larger than a pressing force acting on the other portions, and as a result the water-stop portion of the wire harness, disposed within the grip portion, that is, disposed in registry with the convex portion, is effectively pressed. Therefore, the first division member will not be deformed outwardly by the water-stop portion of the wire harness pressed against this first division member, and therefore the water-stop portion is deformed within the grip portion of the grommet, so that the water-stop agent is positively filled in the interstices between the wires, and a positive water-stop performance of the water-stop portion is easily obtained.

Therefore, this wire harness water-stop structure solves the problem encountered with the conventional construction in which in order to obtain the positive water-stop performance of the water-stop portion of the wire harness, the water-stop portion is kneaded with the hands of the operator after the adhesive tape is wound therearound, and this operation for kneading the water-stop portion is cumbersome, so that the efficiency of the operation is low.

According to a further aspect of the invention, there is provided a grommet for holding a wire harness including a plurality of wires on which an adhesive tape is wound, the wire harness has a water-stop portion, and a water-stop agent is filled in interstices between the plurality of wires at the water-stop portion, the grommet comprising:

a first division member and a second division member for holding the water-stop portion of the wire harness, wherein a holding portion for holding the water-stop portion of the wire harness is formed at the grommet when the first division member is assembled to the second division member; and a diameter of the holding portion is smaller than a diameter of the water-stop portion of the wire harness.

In the grommet of this construction, an inner dimension of the grip portion in the direction of separating of the first and second division members from each other is smaller than a maximum diameter of the wire harness (that is, a diameter of the water-stop portion). Therefore, the water-stop portion of the wire harness is deformed into an elliptical shape within the grip portion of the grommet, so that the water-stop agent is positively filled in the interstices between the wires. Therefore, merely by mounting the grommet on the water-stop portion of the wire harness, the positive water-stop performance of the water-stop portion can be easily obtained.

Therefore, this grommet solves the problem encountered with the conventional construction in which in order to obtain the positive water-stop performance of the water-stop portion of the wire harness, the water-stop portion is kneaded with the hands of the operator after the adhesive tape is wound therearound, and this operation for kneading the water-stop portion is cumbersome, so that the efficiency of the operation is low.

Preferably, an inner face of at least one of the first and second division members which cooperate with each other to form the grip portion of the grommet has a minor-axis elliptical arc-shape.

In the grommet of this construction, the inner face of at least one of the first and second division members has the minor-axis elliptical arc-shape, and is larger in radius of curvature than the outer diameter of the water-stop portion of the wire harness. Therefore, the water-stop portion of the wire harness can be positively flattened into an elliptical shape within the grip portion of the grommet.

According to a further aspect of the invention, there is provided a method of producing a wire harness comprising the steps of:

preparing a wire harness including a plurality of wires on which an adhesive tape is wound, the wire harness having a water-stop portion, and a water-stop agent being filled in interstices between the plurality of wires at the water-stop portion;

preparing a grommet which includes a first division member and a second division member; and assembling the first division member to the second division member so as to form a holding portion which holds the water-stop portion of the wire harness, wherein a diameter of the holding portion of the grommet is smaller than a diameter of the water-stop portion of the wire harness.

In this wire harness-producing method, an inner dimension of the grip portion in the direction of separating of the first and second division members from each other is smaller than a maximum diameter of the wire harness (that is, a diameter of the water stop portion), and therefore the water stop portion of the wire harness is deformed into an elliptical shape within the grip portion of the grommet, so that the water-stop agent is positively filled in the interstices between the wires. Therefore, merely by mounting the grommet on the water-stop portion of the wire harness, the positive water-stop performance of the water-stop portion can be easily obtained.

Therefore, this wire harness-producing method solves the problem encountered with the conventional construction in which in order to obtain the positive water-stop performance of the water-stop portion of the wire harness, the water-stop portion is kneaded with the hands of the operator after the adhesive tape is wound therearound, and this operation for kneading the water-stop portion is cumbersome, so that the efficiency of the operation is low.

DETAILED DESCRIPTION OF THE PREFERRED EMBODIMENT

Figure 7:
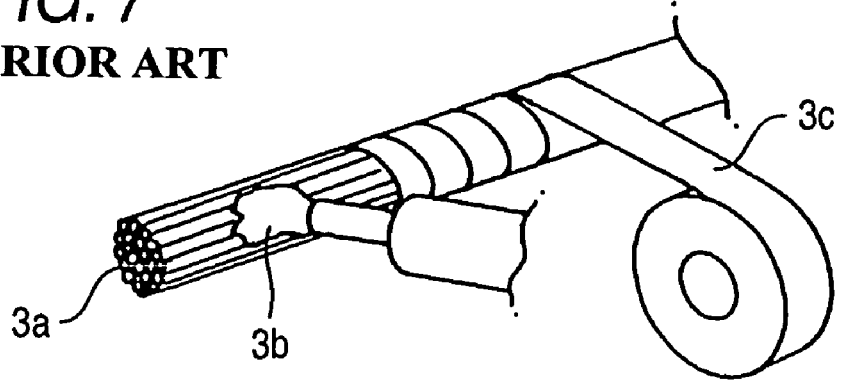
FIG. 7 is a perspective view explanatory of a process of producing a wire harness.

A preferred embodiment of the present invention will now be described in detail with reference to the drawings. In the embodiment described below, with respect to a wire harness, already described in FIG. 7, its portions will be designated by identical or corresponding reference numerals, respectively, and description thereof will be simplified or omitted.

Figure 1:
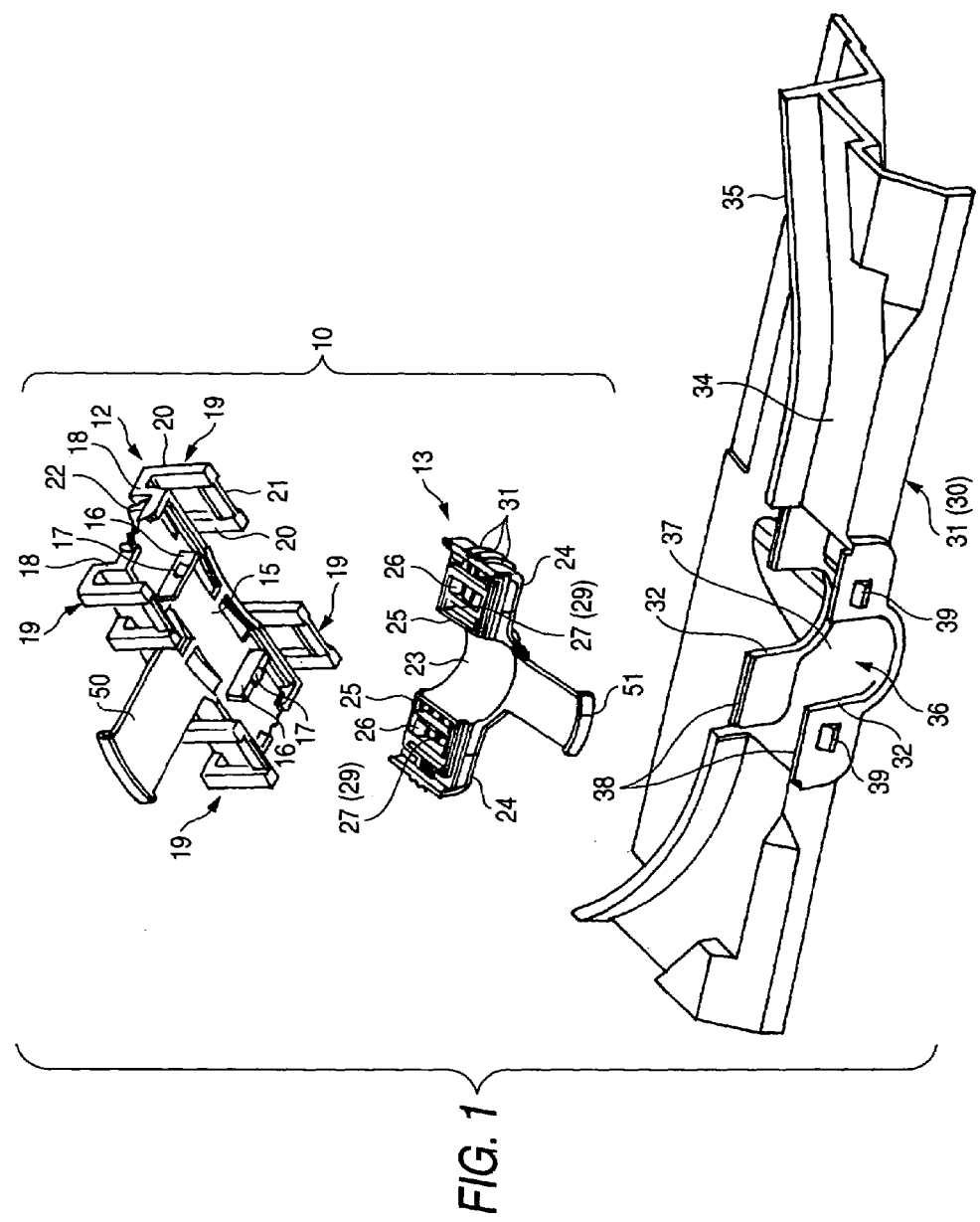
FIG. 1 is an exploded, perspective view showing a division member body and a seal portion of a grommet, and a box body of a waterproof box according to the present invention.
Figure 2A:
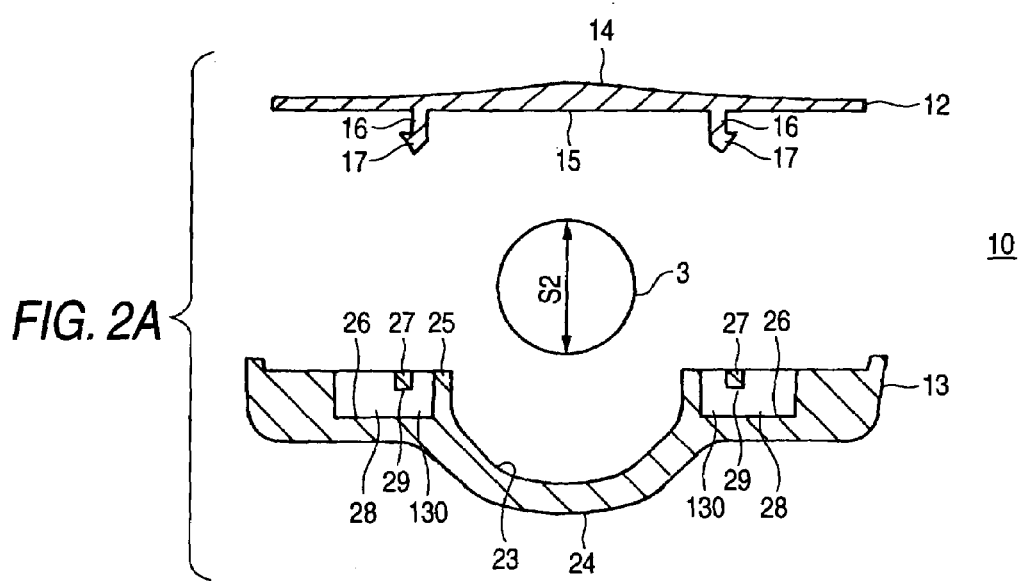
FIG. 2A is a cross-sectional view showing a condition before a water-stop portion of a wire harness is gripped by a grip portion of the grommet.
Figure 2B:
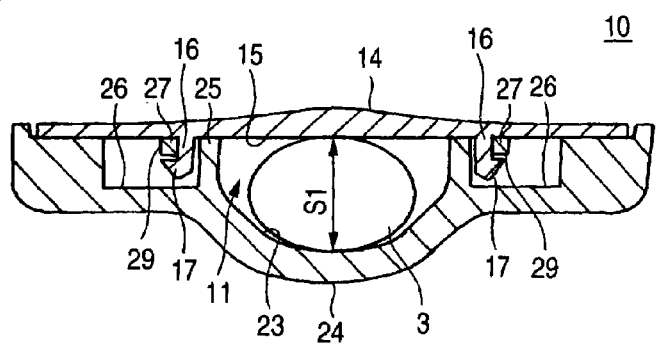
FIG. 2B is a cross-sectional view showing a condition after the water-stop portion of the wire harness is gripped by the grip portion of the grommet.

As shown in FIGS. 1, 2A and 2B, a grommet 10 according to the invention, has a tubular grip portion 11 for gripping a water-stop portion of the wire harness 3 in a radial direction, and this grommet 10 includes a division member body (first division member) 12, and a seal portion (second division member) 13 which are separated from each other along a plane parallel to an axis of the grip portion 11.

The division member body 12 has a rectangular plate shape, and the water-stop portion of the wire harness 3 is adapted to be located at a lengthwise-central portion of the division member body 12 in opposed relation thereto in such a manner that an axis of the water-stop portion extends transversely of the division member body 12. A convex portion 14 of a generally arcuate cross-section is formed on an outer face of the lengthwise-central portion of the division member body 12 facing away from the seal portion 13 in a separating direction. An inner face of the lengthwise-central portion of the division member body 12, facing the seal portion 13 in the separating direction, is formed into a flat face portion 15.

Retaining ribs 16 are formed on and project downwardly respectively from opposite longitudinal end portions of the flat face portion 15 of the division member body 12, and hook shaped retaining piece portions 17 for retaining engagement respectively with retaining portions 29 (described later) on the seal portion 13 are formed respectively at distal ends of the retaining ribs 16, and are directed away from each other in the longitudinal direction. Upwardly-projecting ribs 18 are formed respectively at opposite side edges of the convex portion 14 of the division member body 12, and extend in the longitudinal direction of the division member body 12. Lock arms to be fixed respectively to corresponding retaining projections 39 on a box body 31 of a waterproof box 30 (described later) are formed respectively at opposite longitudinal end portions of each of the ribs 18, the number of these lock arms 19 being four in all.

Each lock arm 19 includes two arms 20 which first extend laterally outwardly from an outer edge of the corresponding rib 18, and then extend downwardly, and an interconnecting piece portion 21 interconnecting distal ends of the two arms 20. Each interconnecting piece portion 21 is adapted to be retainingly engaged with the corresponding retaining projection 39. A seal piece 22 (see FIG. 3), made of rubber or the like, is provided at one side edge portion of the outer face of the division member body 12 on which the convex portion 14 is formed, and this seal piece 22 extends in the longitudinal direction of the division member body 12.

On the other hand, the seal portion 13 consists of a member which is similar in shape to the division member body 12, that is, has a generally rectangular shape when viewed from the top. The water-stop portion of the wire harness 3 is adapted to be located at a lengthwise-central portion of the seal portion 13 in opposed relation thereto in such a manner that the axis of the water-stop portion extends transversely of the seal portion 13.

A concave portion 23 is formed at the lengthwise-central portion of the seal portion 13, and this concave portion 23 has an inner face of a minor-axis elliptical arc-shape larger in radius of curvature than the outer diameter of the wire harness 3. Opposite axial ends of this concave portion 23 are opened, and a bottom of the concave portion 23 is formed into a curved portion 24A bulging downwardly. The concave portion 23 of the seal portion 13 and the flat face portion 15 of the division member body 12 jointly form the tubular grip portion 11 for gripping the water-stop portion of the wire harness 3 in the circumferential direction.

Plate members 24 are formed respectively at opposite ends of the concave portion 23 spaced from each other in the peripheral direction. A recess 26 of a square shape whose four sides are defined by a rib 25 is formed in that portion of each plate member 24 facing the wire harness 3. A rib 27 extends between opposed inner faces of each recess 26 in the widthwise direction of the seal portion 13. A space 28 is formed between a lower face of the rib 27 and a bottom face of the recess 26, and the retaining piece portion 17 of the division member body 12 can be inserted into this space 28, with a gap formed therebetween, and the lower face of the rib 27 serves as the retaining portion 29 for the retaining piece portion 17. A space 130 is formed between the rib 27 and the rib 25 disposed immediately adjacent to the concave portion 23, and the retaining piece portion 17 can be inserted in this space 130 in an elastically-deformed condition (see FIG. 2A).

A plurality of waterproof ribs 131, made of rubber or the like, are formed on the bottom face of the seal portion 13, and extend in the longitudinal direction, and are spaced a predetermined distance from one another in the widthwise direction. A waterproof member (not shown), made of a soft material or the like, is provided on an upper face of each of the plate members 24 formed respectively at the opposite longitudinal ends of the seal portion 13, and this waterproof member forms a seal between the plate member 24 of the seal portion 13 and the division member body 12.

When the water-stop portion of the wire harness 3 is to be gripped by the grip portion 11 of the grommet 10 of the above construction in the radial direction, the water-stop portion of the wire harness 3 is located between the flat face portion 15, of the division member body 12 and the concave portion 23 of the seal portion 13, and then the retaining piece portions 17 of the division member body 12, while elastically deformed, are inserted respectively into the spaces 130 in the seal portion 13, and when the retaining piece portions 17 are further pushed, so that the retaining piece portions 17 reach the spaces 28, respectively, these retaining piece portions 17 are elastically restored to be received in the spaces 28, respectively, and therefore are retainingly engaged with the retaining portions 29, respectively.

As a result, the division member body 12 and the seal portion 13 are combined together, so that the water-stop portion of the wire harness 3 is gripped by the grip portion 11 of the grommet 10 in the radial direction.

After the division member body 12 and the seal portion 13 are combined together, the seal portion 13 can be disengaged from the division member body 12, for example, by pulling one of them hard relative to the other in the separating direction.

Here, an inner dimension S1 of the grip portion 11 in the direction of separating of the division member body 12 and the seal portion 13 from each other may be smaller than a maximum diameter S2 of the wire harness (that is, the diameter of the water-stop portion of the wire harness 3). With this construction, the water-stop portion of the wire harness 3 is deformed into an elliptical shape within the grip portion 11 of the grommet 10, so that the water-stop agent is positively filled in the interstices between the wires 3a.

When the retaining piece portions 17 of the division member body 12 are retainingly engaged with the retaining portions 29 of the seal portion 13, respectively, each retaining piece portion 17 is inserted in the corresponding space 28 in the seal portion 13, with a gap formed therebetween. Therefore, the division member body 12 can be slightly moved relative to the seal portion 13 in the separating direction by an amount corresponding to this gap.

Therefore, a gap is also formed between the opposed faces of each plate member 24 (of the seal portion 13) and division member body 12, and therefore even when the waterproof member of a soft material or the like, interposed between these opposed faces, is displaced out of position, the waterproof member can be easily returned to its initial position (between the opposed faces).

The water-stop portion of the wire harness 3 is thus gripped by the grip portion 11 of the grommet 10 in the radial direction, and in this condition the grommet 10 is located at notch portions 32 of the waterproof box 30.

Figure 3:
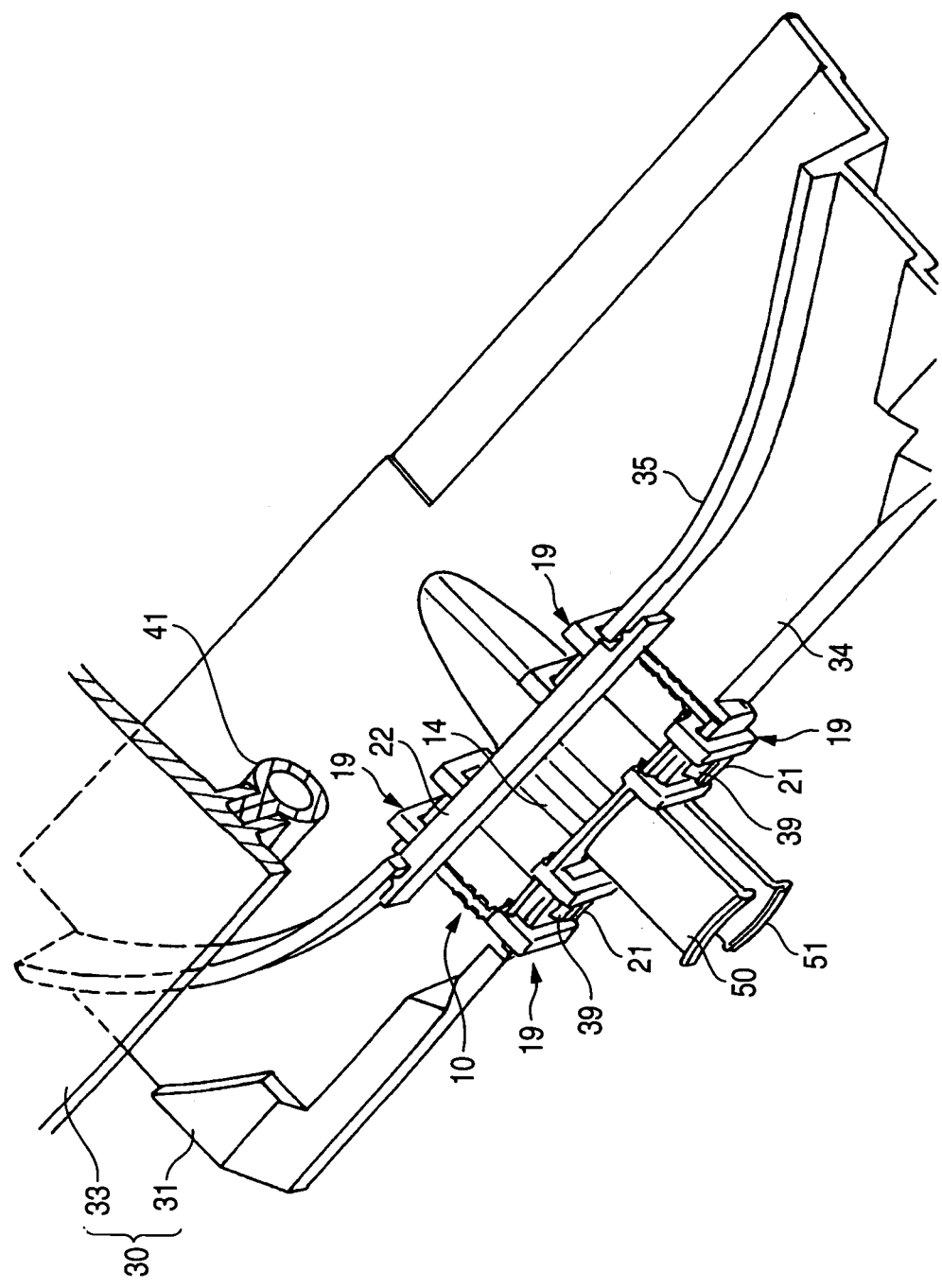
FIG. 3 is an exploded, perspective view of the waterproof box, with the grommet of the invention located in notch portions of the box body.

As shown in FIGS. 1 and 3, the waterproof box 30 includes the box body 31 having the notch portions 32, and a lid 33 for covering an upper opening of the box body 31.

An upper face of one end portion of the box body 31 is formed into a seal face 34 higher than the other portion, and this seal face 34 is delimited by a rib 35.

A concave portion 36, corresponding in shape to the bottom of the seal portion 13 of the grommet 10, is formed at a generally central portion of the seal face 34. A deep bottom portion 37 is formed at a central portion of the concave portion 36, and this deep bottom portion 37 corresponds to the curved portion 24A of the seal portion 13, and is deeper than the other portion of the concave portion 36.

Ribs 38 are formed respectively at opposite sides of the concave portion 36 spaced from each other in a widthwise direction (that is, in the widthwise direction of the grommet 10). The notch portion 32, having a shape corresponding to the cross-sectional shape of the concave portion 23 of the seal portion 13, is formed in a central portion of each of the ribs 38. The retaining projections 39 for locking engagement respectively with the corresponding lock arms 19 of the division member body 12 are formed respectively on outer faces of those portions of each rib 38 disposed respectively at opposite sides of the corresponding notch portion 32.

Figure 4:
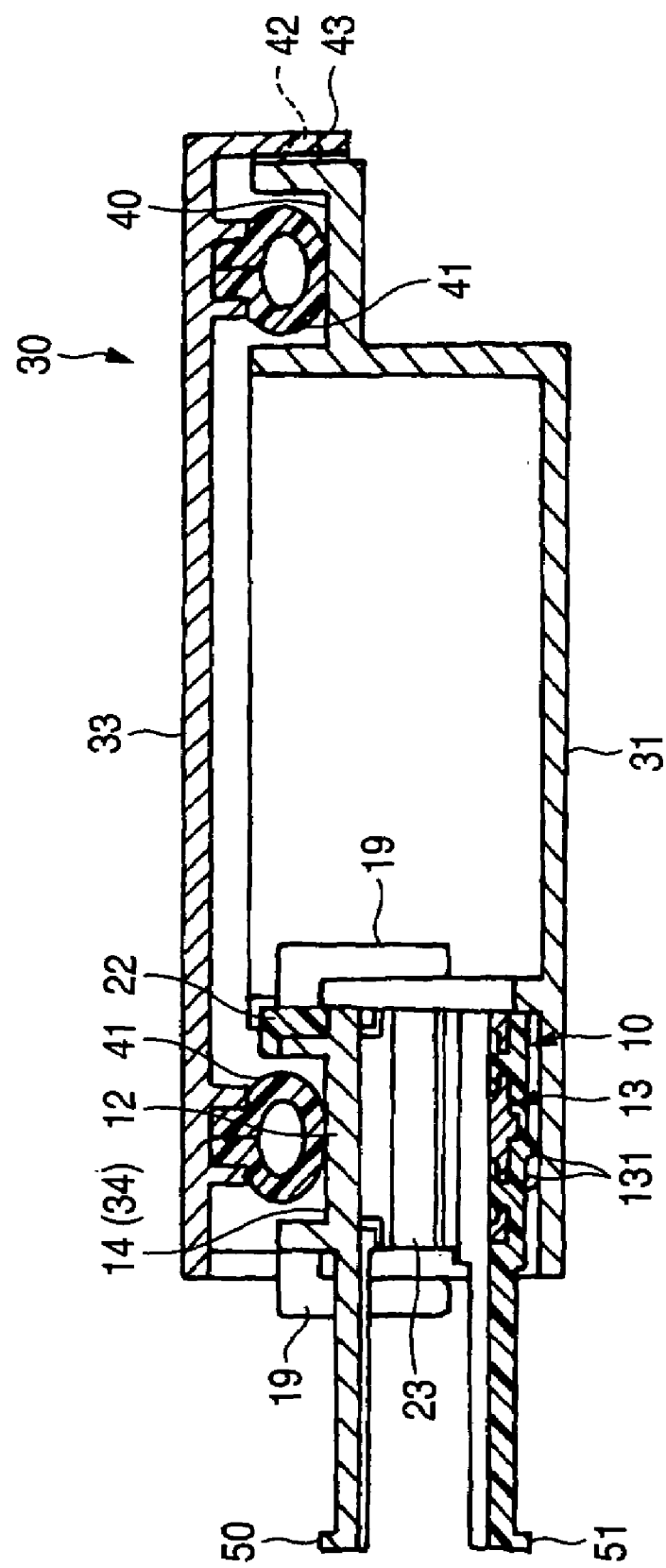
FIG. 4 is a cross-sectional view showing a condition in which the grommet of the invention is fixed to the notch portions of the waterproof box.
Figure 5A:
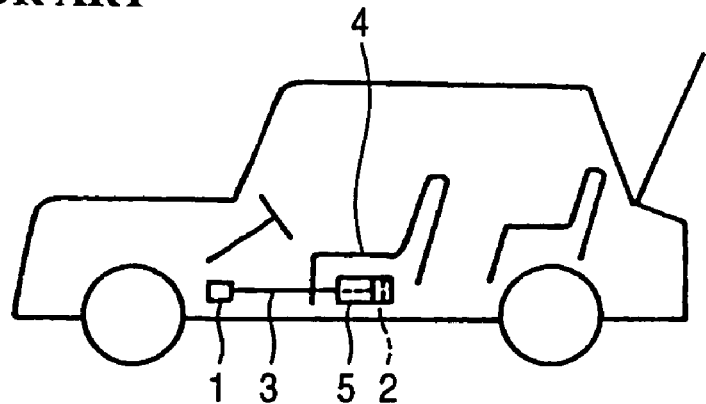
FIG. 5A is a view explanatory of a relief apparatus mounted on a vehicle.
Figure 5B:
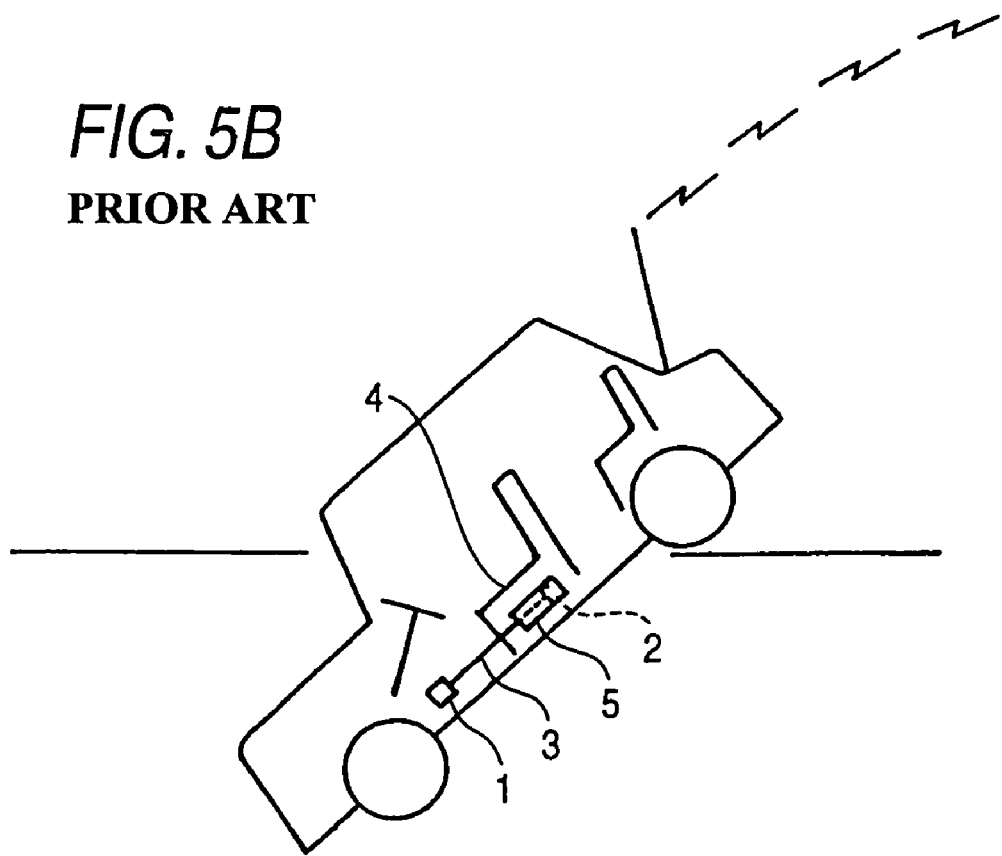
FIG. 5B is a view explanatory of a submerged condition of the vehicle.
Figure 6:
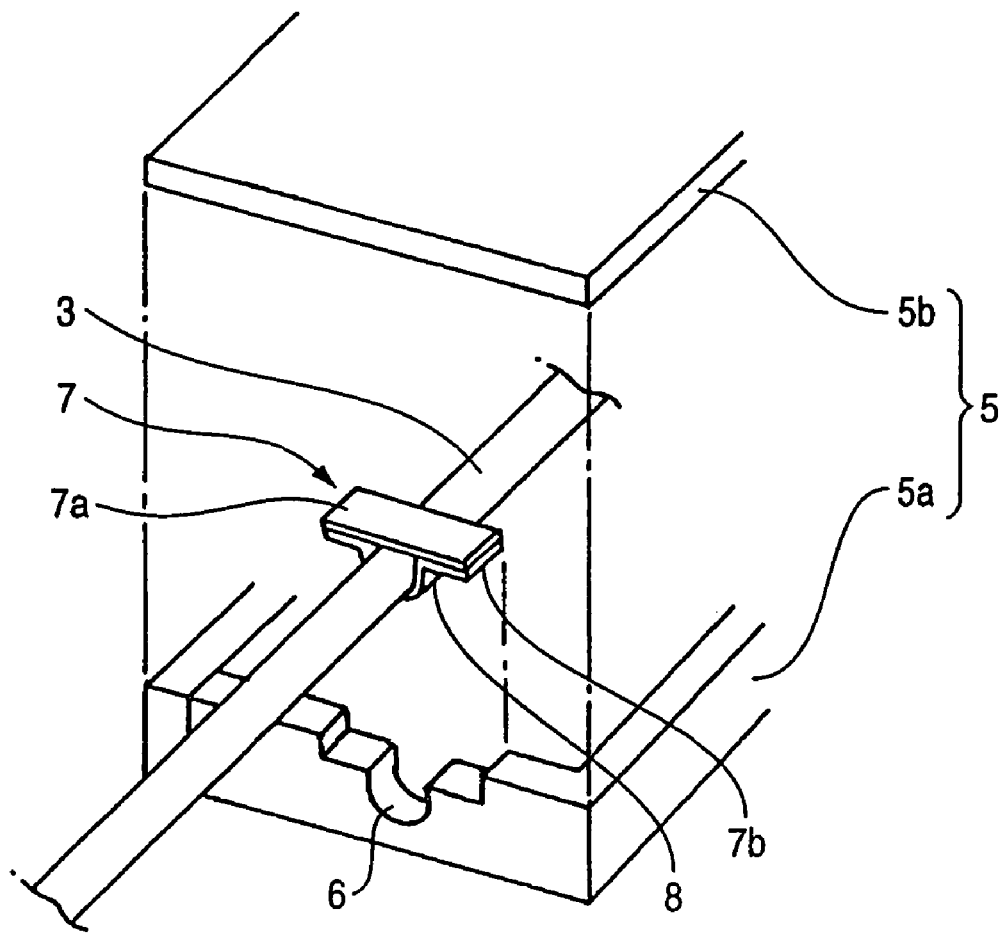
FIG. 6 is an exploded, perspective view explanatory of a grommet and an associated waterproof box.

As shown in FIGS. 3 and 4, a weather strip 41 is mounted on that face of the lid 33 facing the box body 31, and this weather strip 41 is pressed against the seal face 34 formed at the one end portion of the box body 31, a seal face 40 formed at the other end portion of the box body 31, and seal faces (not shown) formed respectively at opposite side portions of the box body.

Retaining portions 43 for retaining engagement respectively with a plurality of retaining projections 42 formed respectively at predetermined portions of a peripheral wall of the box body 31 are formed at a peripheral edge portion of the lid 33, the retaining portions 43 corresponding in number to the retaining projections 42.

For locating the grommet 10 in the notch portions 32 of the waterproof box 30, with the water-stop portion of the wire harness 3 gripped by the grip portion 11 of the grommet 10, first, the seal portion 13 of the grommet 10 is fitted into the concave portion 36 of the box body 31, and then the division member body 12 is pressed against the seal portion 13, and the interconnecting piece portions 21 of the lock arms 19 are retainingly engaged respectively with the retaining projections 39 formed on the box body 31.

As a result, the grommet 10 is fixed to the concave portion 36 of the box body 31 without shaking. In this fixed condition, the outer face of the division member body 12 on which the convex portion 14 is formed lies generally flush with the seal face 34 of the box body 31.

Then, the lid 33 is attached to the box body 31 to close the upper opening thereof, so that the weather strip 41, mounted on the lid 33, is pressed against the seal face 34 formed at the one end portion of the box body 31, the outer face of the division member body 12 of the grommet 10, the seal face 40 formed at the other end portion of the box body 31, and the seal faces formed respectively at the opposite side portions of the box body 31. In this condition, the plurality of retaining portions 43, formed at the peripheral edge portion of the lid 33, are retainingly engaged respectively with the retaining projections 42 formed on the box body 31, thereby fixing the lid 33 to the box body 31, and as a result the grommet 1 is located at the notch portions 32 of the waterproof box 30.

The convex portion 14 is formed on the outer face of the division member body 12, and therefore when the division member body 12 is pressed toward the seal portion 13 by the lid 33 of the waterproof box 30, a pressing force, acting on the convex portion 14, is larger than a pressing force acting on the other portions. As a result, the water-stop portion of the wire harness 3 disposed within the grip portion 11, that is, disposed in registry with the convex portion 14, is effectively pressed, and therefore the division member body 12 will not be deformed outwardly by the water-stop portion of the wire harness 3 pressed against this division member body 12, and therefore the water-stop portion is deformed within the grip portion 11 of the grommet 10, so that the water-stop agent is positively filled in the interstices between the wires 3a.

When the grommet 10 is located at the notch portions 26 of the waterproof box 30, the waterproof ribs 131, formed on the bottom face of the seal portion 13 of the grommet 10, form a seal between the seal portion 13 and the concave portion 36 of the box body 31, and also the waterproof members of the soft material or the like, each interposed between the opposed faces of the corresponding plate member 24 of the seal portion 13 and division member body 12, form a seal between the grommet 10 and the wire harness 3, and further the weather strip 41 forms a seal between the seal face 34 of the box body 31 and the corresponding portion of the lid 33, a seal between the upper face of the division member body 12 and the corresponding portion of the lid 33, a seal between the seal face 40 (formed at the other end portion of the box body 31) and the corresponding portion of the lid 33, and a seal between each of the seal faces (formed respectively at the opposite side portions of the box body 31) and the corresponding portion of the lid 33. With respect to the water-stop portion of the wire harness 3, this water-stop portion is deformed within the grip portion 11 of the grommet 10, so that the water-stop agent is positively filled uniformly in the interstices between the wires 3a, and therefore the water-stop portion is sealed.

In FIGS. 1, 2A and 2B, tongue portions 50 and 51 extend outwardly from the division member body 12 and the seal portion 13, respectively, and the tongue portions 50 and 51 hold the outer peripheral face of the wire harness 3, extending from the waterproof box 30, therebetween, and a tape or the like is wound on these tongue portions 50 and 51.

As is clear from the foregoing description, in the grommet 10, the convex portion 14 of a generally arcuate cross-section is formed on the outer face of the division member body 12 facing away from the seal portion 13 in the separating direction, and with this construction, the water-stop portion of the wire harness 3 is deformed within the grip portion 11 of the grommet 10, so that the water-stop agent is positively filled in the interstices between the wires 3a. Therefore, the positive water-stop performance of the water-stop portion is easily obtained.

In the grommet 10, the inner dimension S1 of the grip portion 11 in the direction of separating of the division member body 12 and the seal portion 13 from each other may be smaller than the maximum diameter S2 of the wire harness (that is, the diameter of the water-stop portion). With this construction, the water-stop portion of the wire harness 3 is deformed into an elliptical shape within the grip portion 11 of the grommet 10, so that the water-stop agent is positively filled in the interstices between the wires 3a. Therefore, merely by mounting the grommet 10 on the water-stop portion of the wire harness 3, the positive water-stop performance of the water-stop portion can be easily obtained.

Therefore, this grommet 10 solves the problem encountered with the conventional construction in which in order to obtain the positive water-stop performance of the water-stop portion of the wire harness 3, the water-stop portion is kneaded with the hands of the operator after the adhesive tape 3c is wound therearound, and this operation for kneading the water-stop portion is cumbersome, so that the efficiency of the operation is low.

And besides, the inner face of the division member body 12, facing the seal portion 13 in the separating direction, is formed into the flat face portion 15, and therefore the water-stop portion of the wire harness 3 can be positively generally flattened within the grip portion 11 of the grommet 11.

Furthermore, when the division member body 12 is pressed toward the seal portion 13 by the lid 33 of the waterproof box 30, the pressing force, acting on the convex portion 14, is larger than the pressing force acting on the other portions, and therefore the intimate contact between the weather strip 41 (mounted on the lid) and the outer face of the division member body 12 is enhanced, so that the sealing ability of this portion is enhanced. And besides, the force of retaining engagement between the retaining portions 43 of the lid 33 and the retaining projections 42 of the box body 31 is increased by a reaction force produced by the convex portion 14, and therefore the lid 33 and the box body 31 can be firmly combined together without the need for increasing the number of the retaining portions 43 and the number of the retaining projections 42.

The grommet of the present invention is not limited to the above embodiment, and suitable modifications and improvements can be made.

For example, although the above embodiment is directed to the construction in which the concave portion 23 whose inner face has a generally arcuate shape is formed in the seal portion 13, the invention is not limited to this construction, and the concave portion whose inner face has the generally arcuate shape may be formed in the division member body 12, or concave portions each having an inner face of a generally arcuate shape may be formed in both of the seal portion 13 and the division member body 12, respectively. Further, the shape of the inner face of the concave portion is not limited to a generally concave shape, and may be any other suitable shape.

For example, the inner face of the concave portion 23, formed in the seal portion 13 of the grommet 10, can be formed into a minor-axis elliptical arc-shape, and can be made larger in radius of curvature than the outer diameter of the water-stop portion of the wire harness 3. With this construction, the water-stop portion of the wire harness 3 can be positively flattened into an elliptical shape within the grip portion 11 of the grommet 10.

The material, shape, dimensions, form, number, mounting position, etc., of the wires, water-stop agent, adhesive tape, water-stop portion, wire harness, grip portion, first and second division members, convex portion, flat face portion, waterproof box, box body, notch portion, lid, etc., illustrated in the above embodiment are arbitrary, and are not limited in so far as the present invention can be achieved.

What is claimed is:

1. A grommet for holding a wire harness including a plurality of wires on which an adhesive tape is wound, the wire harness has a water-stop portion, and a water-stop agent is filled in interstices between the plurality of wires at the water-stop portion, the grommet comprising:
    a first division member, having a convex portion formed on an outer face thereof; and
    a second division member, having a concave portion for receiving the water-stop portion, the concave portion having a shape corresponding to a cross-sectional shape of the wire harness,
    wherein an inner face of the first division member is pressed against the water-stop portion of the wire harness when the convex portion of the first division member is pressed toward the second division member; and
    wherein the inner face of the first division member of the grommet has a flat face.

2. A grommet according to claim 1, wherein the inner face of the first division member does not correspond to a cross-sectional shape of the wire harness.

3. The grommet according to claim 1, wherein the wire harness has a substantially circular cross-section.

* * * * *